United States Patent
Carlin

(10) Patent No.: US 8,578,793 B2
(45) Date of Patent: Nov. 12, 2013

(54) TEST METHOD AND TOOL FOR TESTING FASTENED FASTENERS

(75) Inventor: Carl-Gustaf Carlin, Tyresö (SE)

(73) Assignee: Atlas Copco Industrial Technique Aktiebolag, Stockholm (SE)

( * ) Notice: Subject to any disclaimer, the term of this patent is extended or adjusted under 35 U.S.C. 154(b) by 273 days.

(21) Appl. No.: 13/125,117

(22) PCT Filed: Oct. 22, 2009

(86) PCT No.: PCT/SE2009/000470
§ 371 (c)(1),
(2), (4) Date: May 4, 2011

(87) PCT Pub. No.: WO2010/047638
PCT Pub. Date: Apr. 29, 2010

(65) Prior Publication Data
US 2011/0247434 A1    Oct. 13, 2011

(30) Foreign Application Priority Data

Oct. 22, 2008   (SE) .................................... 0802247
Nov. 12, 2008   (SE) .................................... 0802379

(51) Int. Cl.
*B25B 23/14*    (2006.01)
(52) U.S. Cl.
USPC ........................................ 73/862.21; 73/761
(58) Field of Classification Search
USPC ....................................... 73/760, 761, 862.21
See application file for complete search history.

(56) References Cited

U.S. PATENT DOCUMENTS

| | | | |
|---|---|---|---|
| 3,693,726 A | | 9/1972 | Hornig et al. |
| 3,974,883 A | * | 8/1976 | Sigmund ........................ 173/183 |
| 3,982,419 A | | 9/1976 | Boys |
| 4,008,772 A | * | 2/1977 | Boys .............................. 173/181 |
| 4,008,773 A | * | 2/1977 | Wallace et al. ................. 173/181 |
| 4,106,176 A | * | 8/1978 | Rice et al. .................. 29/407.03 |
| 4,244,095 A | | 1/1981 | Eshghy |
| 4,268,944 A | * | 5/1981 | Eshghy ....................... 29/407.02 |
| 4,316,512 A | | 2/1982 | Kibblewhite et al. |

(Continued)

FOREIGN PATENT DOCUMENTS

DE    4118595 A1    12/1992

OTHER PUBLICATIONS

International Search Report and Written Opinion dated Feb. 11, 2010 (in English) in counterpart International Application No. PCT/SE2009/000470.

*Primary Examiner* — Max Noori
(74) *Attorney, Agent, or Firm* — Holtz, Holtz, Goodman & Chick, PC

(57) ABSTRACT

A screw fastener testing method for verifying the status of a previously tightened screw fastener with respect to installed torque and actual torque growth per angle of rotation properties includes applying an increasing tightening torque on the fastener, measuring the torque magnitude at the start of rotation, of the fastener, measuring the rotational movement of the fastener after the start of rotation, calculating the torque growth per angle of rotation for a certain predetermined test interval of rotation from the start of rotation, comparing the torque magnitude indicated during rotation and the calculated torque growth per angle of rotation during the test interval of rotation with predetermined reference values ($T_{start}$, KR) or (TE, KP), respectively, characteristic for the actual fastener when tightened to a desired target torque level, and approving or disapproving the fastener status in view of the reference values.

18 Claims, 4 Drawing Sheets

(56) References Cited

U.S. PATENT DOCUMENTS

| | | | |
|---|---|---|---|
| 4,768,388 A * | 9/1988 | Fader et al. | 73/862.23 |
| 5,637,968 A * | 6/1997 | Kainec et al. | 318/432 |
| 6,539,603 B1 * | 4/2003 | Bulow | 29/407.01 |
| 6,782,594 B2 * | 8/2004 | Shoberg | 29/407.03 |
| 7,934,428 B2 * | 5/2011 | Schultz et al. | 73/761 |

* cited by examiner

US 8,578,793 B2

TEST METHOD AND TOOL FOR TESTING FASTENED FASTENERS

This application is the U.S. national phase application of International Application No. PCT/SE2009/000470 filed Oct. 22, 2009.

FIELD OF THE INVENTION

The invention concerns a screw fastener testing methods for verifying that joint comprising a tightened screw fastener has been correctly in a tightened to either a point below yield according to a first method, or to a point beyond yield according to a second testing method. The invention also concerns a corresponding screw fastener testing tool.

BACKGROUND OF THE INVENTION

Screw fastener joining of machine elements in practice results in subjecting the machine elements to a clamping force effectuated by one or more individual screw fasteners. The magnitude of the clamping force is dependent on screw fastener dimensions and to what extent the individual screw fastener is tightened, whereby typically reaching of a predetermined tightening torque shuts off the screw tightening tool.

A particular problem is encountered in connection with using screw fasteners for fastening of rigid machine elements such as e.g. rigid steel plates, to each other. The reason for this is that in such cases it might be the case that at the moment of screw driver shut down, because of reached target toque, the fastener is not sufficiently tightened for the machine elements to be fastened tightly against each other. Instead, in the region of the tightened screw fastener, there exists a certain play between the rigid plates because of lack of contact between them in that position. Screw fasteners tightened in such a way are problematic, since they are likely to prematurely break from fatigue due to the fact that a fluctuating load will be taken up by the fastener rather than reducing the clamp load between the parts.

In order to remedy this problem, it has been suggested to position shim elements between the metal plates in order to bridge the play. This method is, however inexact, unreliable and also labour intensive.

Another problem with previously known screw tightening systems is that friction occurring between surfaces of the screw fastener varies considerably, whereby the same shut off torque can lead to great variation of clamping force between different screw fasteners. Since the clamping force typically is realised to vary by 35%, a screw fastener is typically tightened to only part of its capacity, as an example not more than 60% of the theoretical capacity in production screw tightening. This means that the screw fastener has to be over-dimensioned to reach a predetermined clamping force.

As a remedy to this problem it has been suggested to tighten screw fasteners to a point beyond the yielding point, (i.e. where plastic deformation occurs). Hereby the advantage is achieved that 100% of the screw fastener capacity can be used. The clamping force also then typically only varies with the hardening of the material in the screw fastener, which gives smaller variations.

The problem is now to verify that the point beyond the yielding point has been reached. For that purpose different methods have been developed, wherein, the tightening tool includes a measuring gauge in order to secure tightening quality. Another solution is to measure permanent elongation of the screw fastener after loosening it which, however, can give erroneous results since the results depend on the accuracy of a test screw. This method is also labour intensive. Another method is ultra sound measuring.

AIM AND MOST IMPORTANT FEATURES OF THE INVENTION

The invention aims to provide a method and a device that can at least reduce problems of the prior art and to provide a method and tool that can be used easily also by not specially trained operators and that can be used for quick testing of readily tightened screw fasteners with high accuracy without loosening the screw.

These aims are obtained according to the invention through the features of the characterizing portions of the independent claims.

Hereby it can be unequivocally verified that firstly a screw fastener has been tightened correctly and that the machine elements, such as metal plates forming a joint, have been correctly clamped tightly against each other and secondly that a screw fastener has been tightened to a point beyond the yielding point.

The screw fastener can be subjected to a test interval with a rotational movement $\Delta\Phi$ by means of a motor with transmission or simply by having the tool arranged with a sufficiently long handle portion for applying the rotational movement by the hand of the operator. The tool hereby includes a processing unit having circuitry and/or software for measuring angle and relative angle by which the fastener is rotated.

The torque, T, applied to the already tightened screw fastener, and the value of the derivative thereof, $dT/d\Phi$, are measured by the tool during the test interval of rotational movement $\Delta\Phi$, which is a common operation for both methods, and wherein measured torque value, T, is compared with different stored values, dependent on which test method is chosen.

In accordance with the first test method, the measured torque value T, is compared with a stored torque value, ($T_{start}$) for example corresponding to a medium region of the elastic deformation range for the tightened screw fastener, or corresponding to the intended torque level of the screw fastener to be tested. Further, measured or calculated $dT/d\Phi$, value is compared with at least one stored $dT/d\Phi$ value, $K_R$, which is related and close to (preferably just slightly below) the $dT/d\Phi$ value in the elastic deformation range for the tightened screw fastener. The tightened screw fastener is approved if measured or calculated $dT/d\Phi$ is equal to or above $K_R$. Hereby incorrectly tightened screw fasteners related to machine elements with play between the elements are not approved, since it has been revealed that $dT/d\Phi$ for such screw fasteners is noticeably lower than the typical $dT/d\Phi$ value in the elastic deformation range.

In accordance with the second method the measured torque value T, is compared with at least one stored torque value, $T_E$, corresponding to a region or preferably upper region of said elastic deformation range for the tightened screw fastener and measured or calculated $dT/d\Phi$ value is compared with at least one stored $dT/d\Phi$ value, $K_P$, which is related to a lower plastic deformation range for the tightened screw fastener and clearly below a value for $dT/d\Phi$, $K_E$, in an elastic deformation range for the tightened screw fastener. The tightened screw fastener is approved if measured T exceeds $T_E$, and measured or calculated $dT/d\Phi$ is below $K_P$.

The screw fastener testing method according to the invention can be provided through a specific testing tool, for example a testing tool having features resembling an ordinary manually operated lever arm tightening tool but having the capability to derive T into $dT/d\Phi$ as a function of rotation angle Φ. According to the invention, the testing method can also be carried out in a modified screw tightening tool being equipped for performing a screw fastener testing mode thus being switchable between functioning as a fastener tightening tool and a fastener testing tool.

Further features and advantages are obtained in respect of the rest of the claims and will appear from the following detailed description.

BRIEF DESCRIPTION OF DRAWINGS

The invention will now be described in greater detail at the background of embodiments and with reference to the annexed drawings, wherein FIGS. 1a and 1b in different use illustrate a screw fastener testing tool according to the invention.

DETAILED DESCRIPTION OF EMBODIMENTS

Figure 1A:
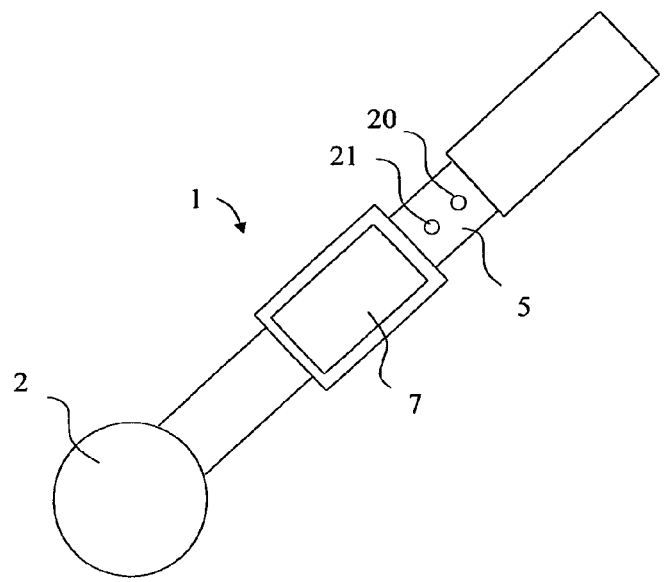
Figure 1B:
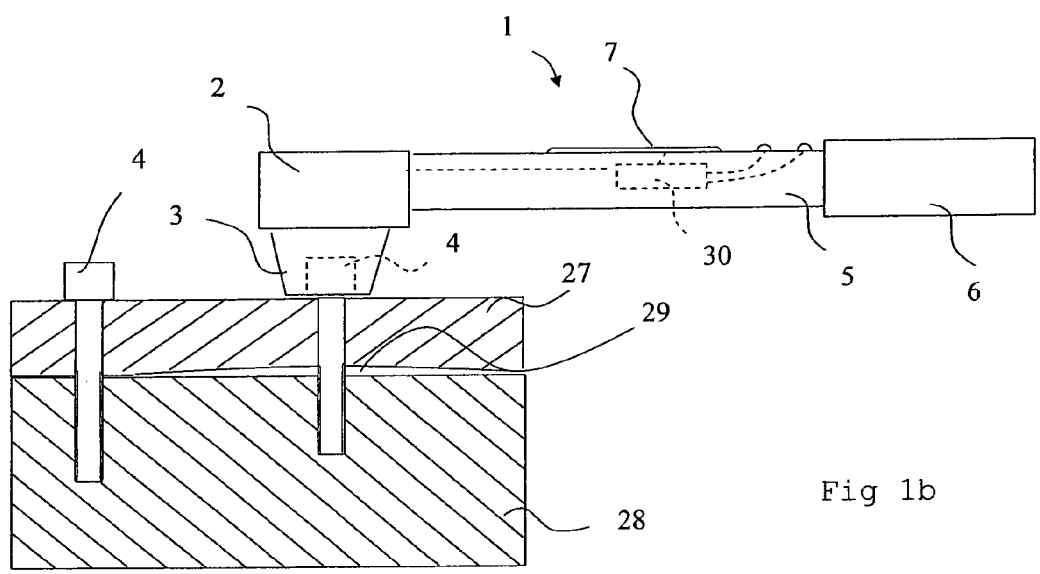

The tool according to FIGS. 1a and 1b is provided with a driving head 2 which includes wrenching means. The wrenching means is actuated by a motor and a transmission (not shown) being included in the body of the tool 1. As an alternative, the tool 1 does not include a motor or a transmission. In that case it is solely operated by hand power.

In connection with the head 2 there is an engagement socket 3 for the engagement with the head of a screw fastener 4 to be tested. The tool further includes a handle portion 5 and a handle grip 6. Reference numeral 7 indicates a display capable of displaying measured torque, performed rotation angle and further parameters to be explained below. In FIG. 1b, elements to be screwed together over a contact face 29 are indicated with 27 and 28.

A processing unit (CPU) 30 is included in the tool and includes circuitry and/or software for parameter measuring, processing measured values, storing significant T, and K values for fasteners and applications, comparing unit(s) for comparing measured values with stored values and output unit(s) for emitting signals relating to result of comparison(s) by the comparing unit(s). 20 indicates a (e.g. green) lamp for emitting an approve signal and 21 indicates a (e.g. red) lamp for emitting a non approve signal.

Figure 2:
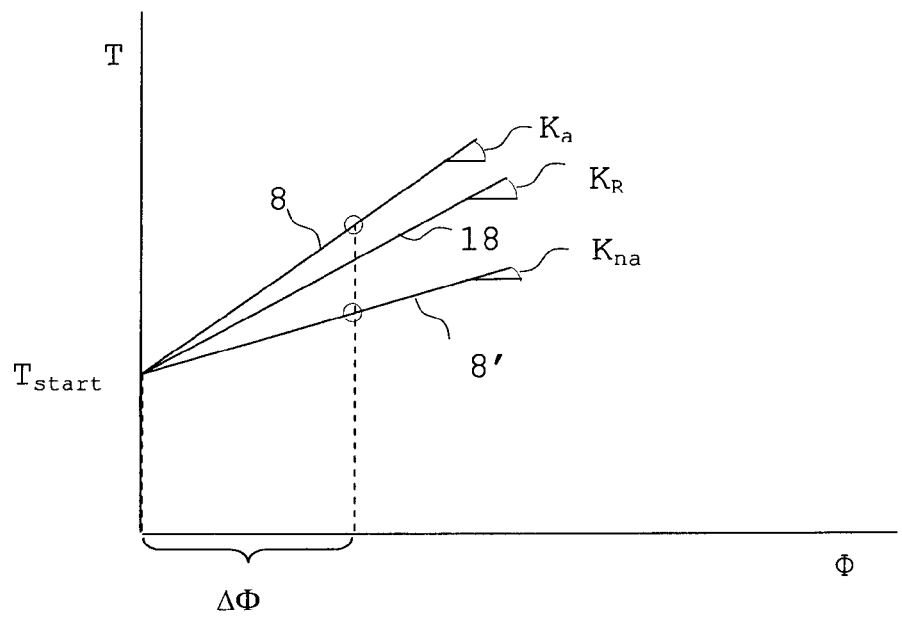
FIG. 2 is a diagram over torque as a function of rotational angle for a screw fastener to be tested according to the first method according to the invention.

In FIG. 2 is illustrated torque (T) as a function of rotational angle (Φ). In respect of a typical screw fastener, the curve reaches a relatively linear range corresponding to an area of elastic deformation of the fastener. This is well known to the person skilled in the art and will therefore not be discussed further here. The diagram illustrates that a screw fastener is provided with an increasing torque level, in order to rotate the screw fastener with test interval angle, $\Delta\Phi$. The line 18 represents a $dT/d\Phi$ value, $K_R$, equal to and above which the screw fastener is approved and below which the screw fastener is not approved. The curve 8 represents an approved screw fastener where $dT/d\Phi$ is $K_a$ which is a greater value than $K_R$. The curve 8' represents a not approved screw fastener where $dT/d\Phi$ is $K_{na}$ which is a lower value than $K_R$. It could be mentioned that in respect of a screw fastener according to curve 8', the torque growth relates mainly to deformation under displacement of the elements to be tightened by the screw fastener, which typically is a noticeably lower value than $K_R$.

According to the invention, and in order to verify if a screw fastener is correctly tightened, the testing tool 1 in FIGS. 1a and 1b is applied to the respective fastener and drawn until the fastener starts to rotate. The start of rotation should, in order to be approved, relate to the intended installed torque level during previous tightening, $T_{start}$, which as an example can be 60 Nm for a screw fastener of a certain dimension. The screw fastener is thus rotated an test interval with angle $\Delta\Phi$, see FIG. 2, whereby measured or calculated $dT/d\Phi$ value is compared with a stored $dT/d\Phi$ value, $K_R$. The tightened screw fastener is approved if measured T is equal or above $T_{start}$ and the calculated $dT/d\Phi$ is equal to or above $K_R$. As an additional condition it is also preferably controlled that the torque value T is below a maximal torque value, $T_{max}$, the exceeding of which could jeopardize the integrity of the screw fastener. $\Delta\Phi$ is a test interval and is measured to be enough for reaching a secure diagnosis for the screw fastener. The interval could be a predetermined interval, and lies typically between 2-10 degrees.

The values $K_R$ and $T_{start}$ are conveniently stored in a memory being included in the CPU of the tool 1 in FIGS. 1a and 1b, and the progression of the testing method can be signalled on the display 7 as a graph or as digits. In a more simple variant, the tool 1 can be provided solely with indicating LED:s, such as the lamps 20 and 21, for example signalling green light or red light for indicating if a screw fastener is approved or not approved.

Figure 3:
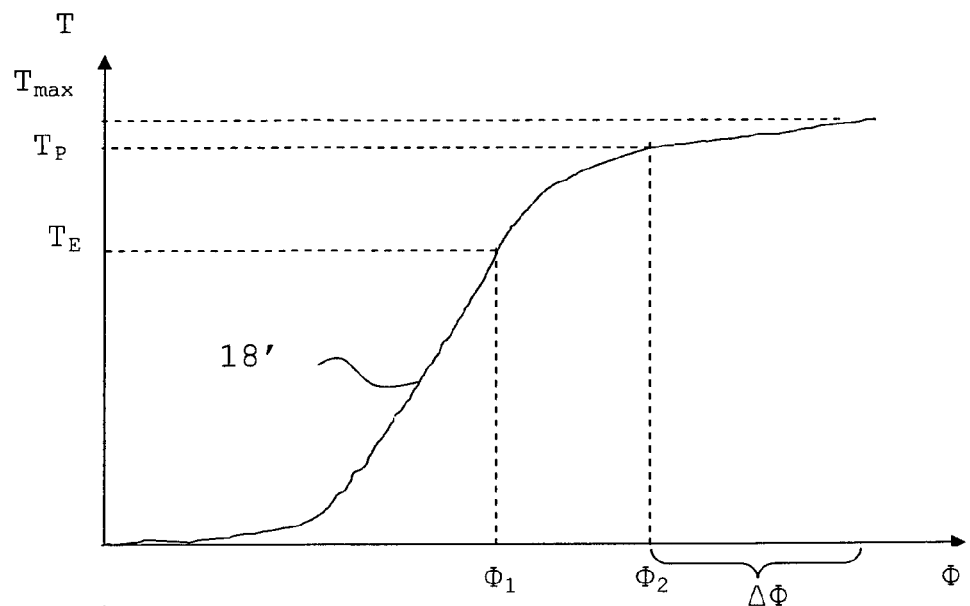
FIG. 3 is a diagram over torque as a function of rotational angle for a screw fastener to be tested according to the second method according to the invention.

In FIG. 3 the curve 18' illustrates torque (T) as a function of rotational angle (Φ). In respect of a typical screw fastener, the curve reaches a relatively linear range corresponding to an area of elastic deformation of the fastener. In an upper region of the curve 18' the yielding point is reached and thereupon plastic deformation of the screw fastener occurs. This is well known to the person skilled in the art and will therefore not be discussed further here.

In an upper area of the elastic range of the torque curve, a point $T_E$ is identified, which is safely still within the elastic range but preferably at an upper region thereof. In the plastic deformation range, a point $T_P$ is identified which is safely within the plastic deformation range but also safely below a break load for the fastener.

Figure 4:
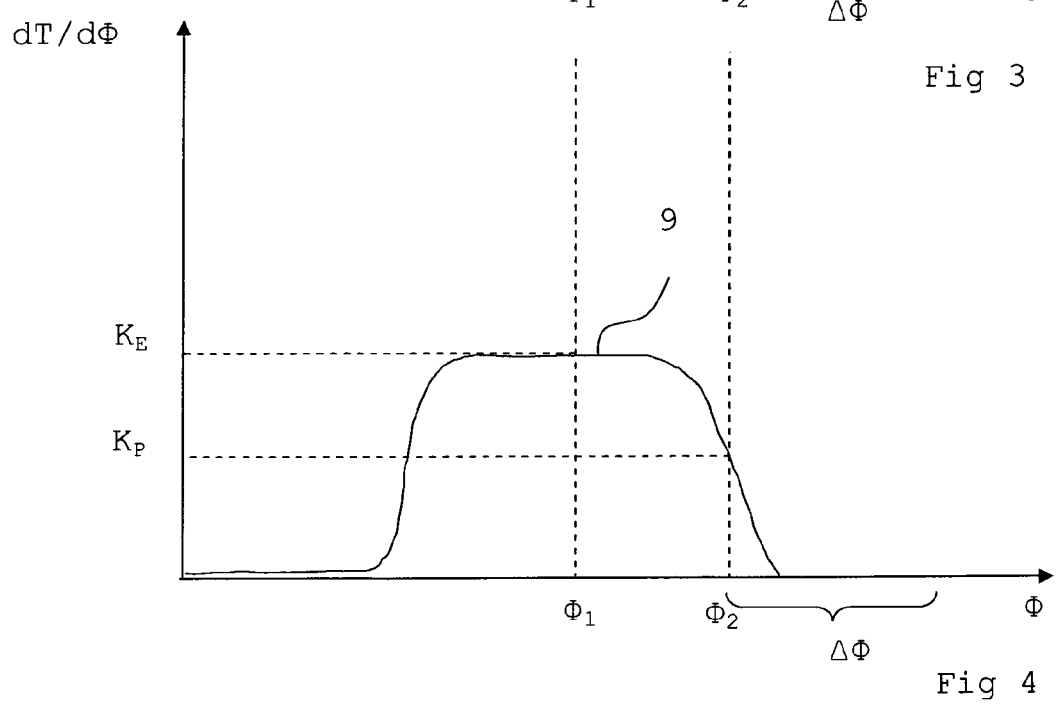
FIG. 4 is a diagram over $dT/d\Phi$ as a function of rotational angle for a screw fastener to be tested according to the second method according to the invention.

In FIG. 4 the curve 9 illustrates $dT/d\Phi$ as a function of Φ, wherein the corresponding points are identified: $K_E$ corresponding to $T_E$ for the curve 18' and $K_P$ corresponding to T.

Typically, $T_E$, $T_P$ and $K_E$ are chosen based on tests on relevant fasteners in relevant applications. $T_E$, $T_P$ and $K_E$ can also be calculated based on experience and available data about similar fasteners and similar applications.

According to the invention, and in order to verify if a screw fastener is correctly tightened, the testing tool 1 in FIGS. 1a and 1b is applied to the respective fastener and rotated the test interval angle $\Delta\Phi$, see FIG. 3, whereupon, on the one hand measured torque value T is compared with the stored torque value $T_E$ and on the other hand measured or calculated $dT/d\Phi$ value is compared with at least one stored $dT/d\Phi$ value, $K_P$ and preferably also with $K_E$. The tightened screw fastener is approved if measured or calculated $dT/d\Phi$ is below $K_P$ and measured T exceeds $T_E$.

From the FIGS. 3 and 4 is also apparent that $T_P$ and $K_P$ correspond to a rotational angle $\Phi_2$, whereas $T_E$ and $K_E$ corresponds to a rotational angle $\Phi_1$. $\Delta\Phi$ is a calculated value which is between a calculated starting point for the plastic range in FIG. 3 and ending in the region just passed $\Phi_2$. A typical value for $\Delta\Phi$ is within the range 2-20°.

The values $K_P$, $K_E$, $T_P$, $T_E$ and $T_{max}$ are conveniently stored in a memory being included in the CPU 30 of the tool 1 in FIGS. 1a and 1b and the progression of the testing method can be signalled on the display 7 as a graph or as digits. In a more simple variant, the tool 1 can be provided solely with indicating LED:s, such as the lamps 20 and 21, for example signalling green light or red light for indicating if a screw fastener is approved or not approved.

Figure 5:
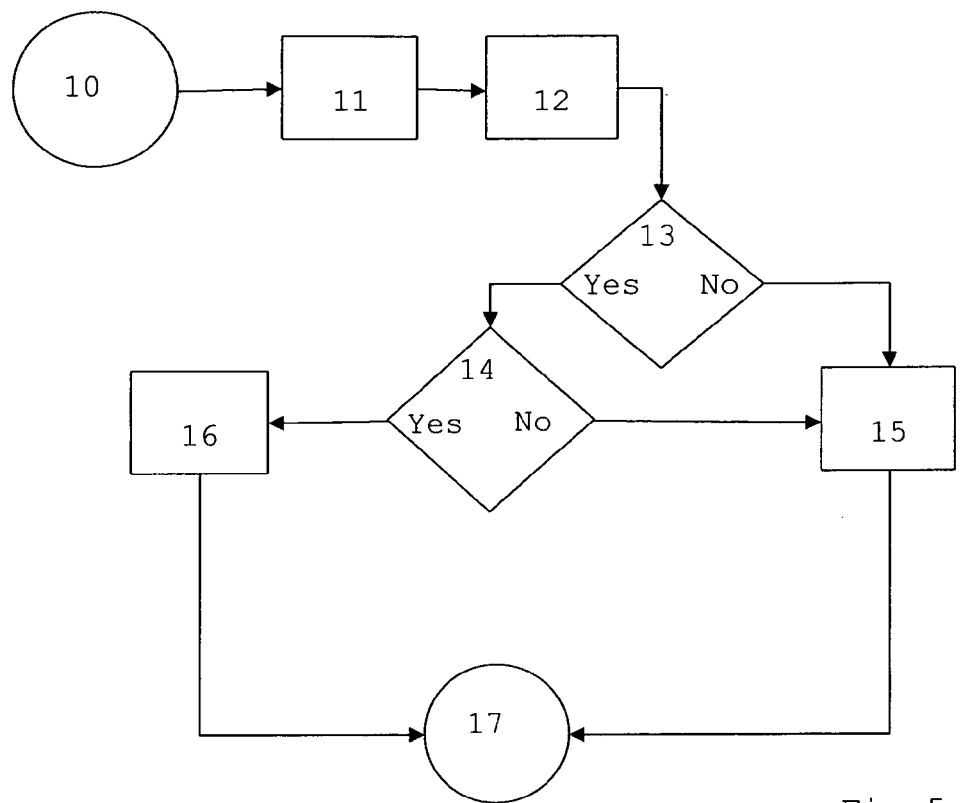
FIG. 5 is a block diagram over the first method according to the invention.

In FIG. 5 a sequence according to the first method is illustrated, wherein
  position 10 indicates start of the sequence,
  position 11 indicates starting the tool and applying the gripping head thereof onto a fastener to be tested,
  position 12 indicates applying of a torque to the already tightened screw, while measuring torque value T and comparing it with a stored torque value $T_{start}$ corresponding to a predetermined start torque. When $T_{start}$ has been reached, the sequence is passed on to position 13, otherwise the sequence is passed on to position 15 and a not approved signal is emitted, whereupon the sequence is ended in position 16. in position 13 the screw fastener is rotated a test interval or predetermined angle $\Delta\Phi$ and $dT/d\Phi$ is measured or calculated and compared with a stored $dT/d\Phi$ value, $K_R$. If measured or calculated $dT/d\Phi$ value is not above $K_R$ the sequence is passed on to position 15 wherein a not approved signal is emitted, whereupon the sequence is ended in position 16. If measured or calculated $dT/d\Phi$ is equal to or above $K_R$, the sequence is passed on to position 14 for emitting an approve signal, whereupon the sequence is terminated in position 16.

Figure 6:
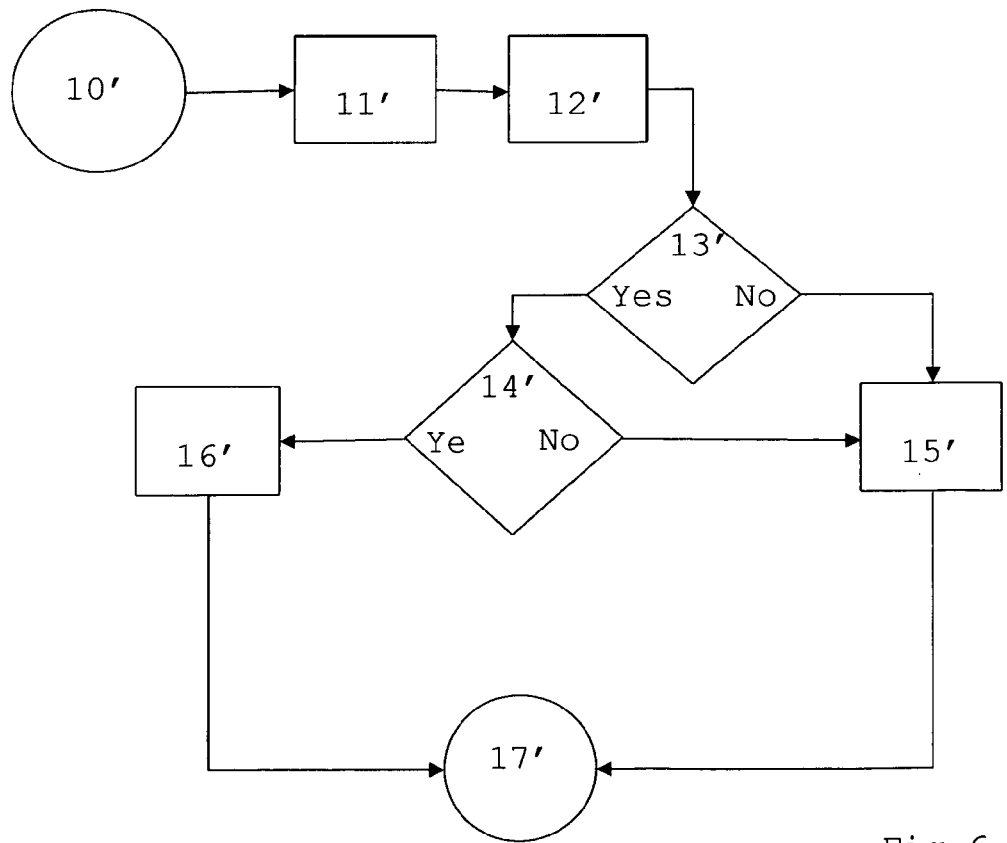
FIG. 6 is a block diagram the second method according to the invention.

In FIG. 6 a sequence according to the second method is illustrated, wherein
  position 10' indicates start of the sequence,
  position 11' indicates starting the tool and applying the gripping head thereof onto a fastener to be tested,
  position 12' indicates rotating the tool a test interval or predetermined angle $\Delta\Phi$, while measuring the needed torque level
  in position 13' measured or calculated $dT/d\Phi$ is compared with one stored derivative $dT/d\Phi$ value and if measured or calculated value is not below $K_P$ the sequence is passed on to position 15' wherein a not approved signal is emitted, whereupon the sequence is ended in position 17'. If measured or calculated $dT/d\Phi$ is below $K_P$, the sequence is passed on to position 14 wherein measured torque value T is compared with stored torque value $T_E$. If measured T does not exceed $T_E$ the sequence is passed on to position 15' and a not approved signal is emitted, whereupon the sequence is terminated in position 17'. If measured T exceeds $T_E$ the sequence is passed on to position 16' for emitting an approve signal whereupon the sequence is terminated in position 17'.

The invention can be modified within the scope of the following claims.

The tool includes the following functional units: a device for subjecting the tightened screw fastener to a rotational movement which can be a motor or simply a handle operated by hand. A device for measuring the torque can be a common sensor known in the art of screw drivers. A device for measuring or calculating the value of the derivative of the torque, $dT/d\Phi$, can be circuitry processing signals from a torque sensor and an angle counter. An evaluation device is conveniently realised as software in the CPU 30. First and second comparing units are simple logical components well known in the art.

The measured or calculated $dT/d\Phi$ value can be easily obtained by creating the derivative from measured torque and rotational angle. This is per se within the knowledge of the person skilled in the art.

It is preferred that screw fastener approval and/or non approval is followed by the tool emitting a particular visual or audible signal indicating the result from the evaluation device. As an alternative, the result can be viewed simply as digits or a curve on the tool display.

The CPU can be arranged outside the very tool and communicate with the tool over cable or wireless.

The tool can advantageously be equipped with a second memory and/or be connectable to central circuitry and central memory means for storing approve and not approved data for individual fasteners for documentation purposes.

The screw fastener testing method according to the invention can be provided through a specific testing tool, for example a testing tool having features resembling an ordinary manually operated lever arm tightening tool but having the capability to derive T into $dT/d\Phi$ as a function of rotation angle $\Delta\Phi$. The tool can preferably also be equipped with a switching means to enable the operator to choose between the to testing methods. According to the invention, the testing method can also be carried out in a modified screw tightening tool being equipped for performing a screw fastener testing mode thus being switchable between functioning as a fastener tightening tool and a fastener testing tool.

The invention claimed is:

1. A screw fastener testing method for verifying a fastener status of a previously tightened screw fastener with respect to installed torque and actual torque growth per angle of rotation properties, the method comprising:
  applying an increasing tightening torque on the fastener, in order to rotate said fastener, for accomplishing a test interval of rotation;
  measuring a torque magnitude during said test interval of rotation;
  measuring rotational movement of the fastener during said test interval of rotation;
  calculating the torque growth per angle of rotation for said test interval of rotation;
  comparing the measured torque magnitude and the calculated torque growth per angle of rotation during said test interval of rotation with predetermined reference values that are characteristic for the fastener when tightened to a desired target torque level; and
  approving or disapproving the fastener status in view of said reference values.

2. The testing method according to claim 1, wherein said predetermined reference values comprise approved intervals of said torque magnitude and said torque growth per angle of rotation.

3. The testing method according to claim 1, wherein the test interval has a value in the range of 2-10°.

4. The testing method according to claim 1, wherein screw fastener status results, which indicate approval or non approval, are indicated to an operator by emitting one of a visual signal and an audible signal.

5. A screw fastener testing tool for verifying a status of a previously tightened screw fastener with respect to installed torque and actual torque growth per angle of rotation properties, the tool comprising:

a device for applying an increasing tightening torque on the fastener, in order to rotate said fastener, for accomplishing a test interval of rotation;

a device for measuring a torque magnitude during said test interval of rotation;

a device for measuring rotational movement of the fastener during said test interval of rotation;

a device for calculating the torque growth per angle of rotation for said test interval of rotation; and a comparing unit for comparing the measured torque magnitude and the calculated torque growth per angle of rotation during said test interval of rotation with predetermined reference values that are characteristic for the fastener when tightened to a desired target torque level, and approving or disapproving the fastener status in view of said reference values.

6. The testing tool according to claim 5, wherein said predetermined reference values comprise approved intervals of said torque magnitude and said torque growth per angle of rotation.

7. The testing tool according to claim 5, wherein the test interval has a value in the range of 2-10°.

8. The testing tool according to claim 5, wherein at least one of screw fastener status approval and disapproval is followed by the tool emitting one of a visual signal and an audible signal indicating a result from the comparing unit.

9. The testing tool according to claim 5, further comprising a motor and a transmission device for subjecting the previously tightened screw fastener to the rotational movement.

10. The testing method according to claim 2, wherein the test interval has a value in the range of 2-10°.

11. The testing method according to claim 2, wherein screw fastener status results, which indicate approval or non approval, are indicated to an operator by emitting one of a visual signal and an audible signal.

12. The testing method according to claim 3, wherein screw fastener status results, which indicate approval or non approval, are indicated to an operator by emitting one of a visual signal and an audible signal.

13. The testing tool according to claim 6, wherein the test interval has a value in the range of 2-10°.

14. The testing tool according to claim 6, wherein at least one of screw fastener status approval and disapproval is followed by the tool emitting one of a visual signal and an audible signal indicating a result from the comparing unit.

15. The testing tool according to claim 7, wherein at least one of screw fastener status approval and disapproval is followed by the tool emitting one of a visual signal and an audible signal indicating a result from the comparing unit.

16. The testing tool according to claim 6, further comprising a motor and a transmission device for subjecting the previously tightened screw fastener to the rotational movement.

17. The testing tool according to claim 7, further comprising a motor and a transmission device for subjecting the previously tightened screw fastener to the rotational movement.

18. The testing tool according to claim 8, further comprising a motor and a transmission device for subjecting the previously tightened screw fastener to the rotational movement.

* * * * *